US012598650B2

(12) United States Patent (10) Patent No.: US 12,598,650 B2
Xin et al. (45) Date of Patent: Apr. 7, 2026

(54) PRIORITIZATION OF R-TWT TIDS IN R-TWT SPS

(71) Applicants: SONY GROUP CORPORATION, Tokyo (JP); SONY CORPORATION OF AMERICA, New York, NY (US)

(72) Inventors: Liangxiao Xin, Santa Clara, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 369 days.

(21) Appl. No.: 18/331,860

(22) Filed: Jun. 8, 2023

(65) Prior Publication Data

US 2024/0008086 A1     Jan. 4, 2024

Related U.S. Application Data

(60) Provisional application No. 63/371,406, filed on Aug. 15, 2022, provisional application No. 63/367,387, filed on Jun. 30, 2022, provisional application No. 63/367,342, filed on Jun. 30, 2022.

(51) Int. Cl.
| | |
|---|---|
| *H04W 74/0816* | (2024.01) |
| *H04W 72/566* | (2023.01) |
| *H04W 74/0833* | (2024.01) |
| *H04W 84/12* | (2009.01) |

(52) U.S. Cl.
CPC ..... *H04W 74/0816* (2013.01); *H04W 72/566* (2023.01); *H04W 74/0833* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2023/0239788 A1* | 7/2023 | Kim | H04W 52/028 |
| | | | 370/311 |
| 2023/0239798 A1* | 7/2023 | Shafin | H04W 4/70 |
| | | | 370/338 |

(Continued)

FOREIGN PATENT DOCUMENTS

| | | |
|---|---|---|
| GB | 2600249 A1 | 4/2022 |
| WO | 2022143733 A1 | 7/2022 |
| WO | 2022154534 A1 | 7/2022 |

OTHER PUBLICATIONS

Haider, Muhammad Kumail et al., "CC36 CR for Restricted TWT Setup", IEEE P802.11 Wireless LANs, doc: IEEE802.11-21/1224r11, Aug. 12, 2021, pp. 1-9.

(Continued)

*Primary Examiner* — Faiyazkhan Ghafoerkhan
(74) *Attorney, Agent, or Firm* — O'BANION & RITCHEY LLP; John P. O'Banion

(57) ABSTRACT

Methods are described for overcoming contention issues during R-TWT SPs. In particular, enhanced mechanisms are defined in prioritizing transmissions of R-TWT TIDs during corresponding R-TWT SPs. In addition, enhanced access mechanisms are described for overcoming issues with stations accessing the channel after sensing an idle channel after a DIFS or AIFS time period.

28 Claims, 6 Drawing Sheets

(56) References Cited

U.S. PATENT DOCUMENTS

| 2023/0262766 A1* | 8/2023 | Kim | .................. | H04W 74/0808 |
| | | | | 370/329 |
| 2024/0008086 A1* | 1/2024 | Xin | ..................... | H04W 72/566 |
| 2024/0163916 A1* | 5/2024 | Ryu | .................. | H04W 74/0866 |
| 2024/0251443 A1* | 7/2024 | Lu | ....................... | H04W 74/085 |

OTHER PUBLICATIONS

Chunyu Hu (Facebook), Traffic Prioritization During Restricted TWT SPs, IEEE 802.11-21/1115r0, Jul. 2021.
Duncan Ho (Qualcomm), CC36 CID 4822 related to the QoS Characteristics element, IEEE 802.11-22/0200r4, May 2022.
Jason Yuchen Guo (Huawei Technologies Co. Ltd.), CR for rTWT TXOP Rules, IEEE 802.11-22/0139r.

* cited by examiner

PRIORITIZATION OF R-TWT TIDS IN R-TWT SPS

CROSS-REFERENCE TO RELATED APPLICATIONS

This application claims priority to, and the benefit of, U.S. provisional patent application Ser. No. 63/371,406 filed on Aug. 15, 2022, incorporated herein by reference in its entirety. This application claims priority to, and the benefit of, U.S. provisional patent application Ser. No. 63/367,387 filed on Jun. 30, 2022, incorporated herein by reference in its entirety. This application claims priority to, and the benefit of, U.S. provisional patent application Ser. No. 63/367,342 filed on Jun. 30, 2022, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

BACKGROUND

1. Technical Field

The technology of this disclosure pertains generally to restricted-target wait time (R-TWT) operations, and more particularly to assigning R-TWT TIDs, and preventing collisions in R-TWT Service Periods (SPs) when DIFS/AIFS accesses are utilized.

2. Background Discussion

Restricted-Target Wait Time (R-TWT) scheduling is performed by the Access Point (AP) which determines which R-TWT TIDs are considered latency sensitive traffic. However, the present configuration can lead to abuses in the use of R-TWT IDs. In addition, collisions can arise in R-TWT SPs when DIFS/AIFS accesses are utilized.

Accordingly, a need exists for enhanced mechanisms within a wireless protocol for addressing these R-TWT issues. The present disclosure fulfills these needs and provides additional benefits over existing systems.

BRIEF SUMMARY

Wireless protocol enhancements under IEEE 802.11 (e.g., IEEE 802.11be) are described for overcoming contention issues during R-TWT SPs. In particular, enhanced mechanisms are defined in prioritizing transmissions of R-TWT TIDs during corresponding R-TWT SPs. In addition, enhanced access mechanisms are described for overcoming issues with stations accessing the channel after sensing an idle channel after a DIFS or AIFS time period.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

1. Communication Station (STA) Hardware

Figure 1:
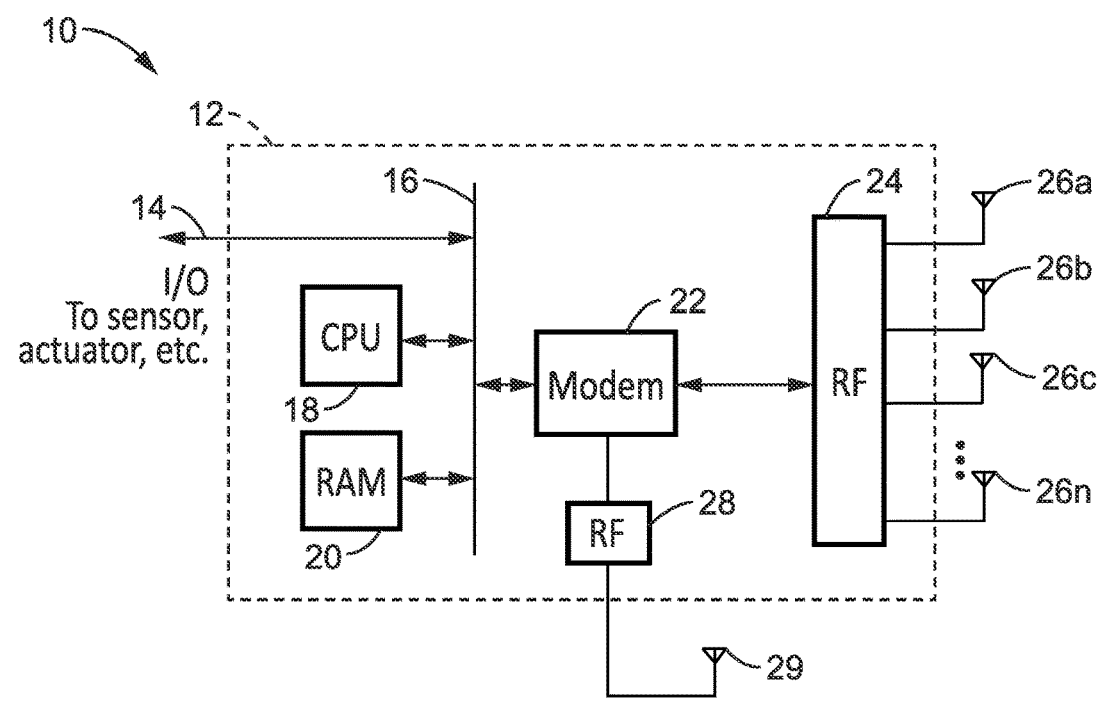
FIG. 1 is a block diagram of communication station hardware, according to at least one embodiment of the present disclosure.

FIG. 1 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

2. R-TWT ID Issue

2.1. R-TWT ID Problem Statement

IEEE 802.11be [Draft P802.11be_D2.0] defines Stream Classification Service (SCS) traffic stream (TS) and a Restricted-Target Wait Time (R-TWT) schedule to target low latency features in Wi-Fi networks.

A member station (STA) of a R-TWT and the R-TWT scheduling Access Point (AP) negotiates and defines R-TWT Traffic Identifiers (TIDs) that are regarded as latency sensitive traffic during the Service Periods (SPs) of the R-TWT and should be transmitted with higher priority than regular traffic during the SPs of the R-TWT. However, it is not defined how to set the R-TWT TIDs during the membership setup procedure. Enhanced protocols are required to provide restrictions/rules toward avoid the abuse of R-TWT TIDs during the R-TWT SPs.

Both the member STA and the non-member STA end its TXOP before the start time of the upcoming R-TWT SP. However, it does not show the different behavior between the member STA and the non-member STA for the upcoming R-TWT SP. If the member STA and the non-member STA have the same behavior, there is no advantage of being a member STA of the in an upcoming R-TWT SP.

2.2. R-TWT ID Solution Overview

The disclosed technologies enhance the existing protocol by defining rules and restrictions when setting R-TWT TIDs during a R-TWT membership negotiation procedure and how to prioritize the transmissions of the R-TWT TIDs during the corresponding R-TWT SPs. Section 3 describes solutions according to the present disclosure.

3. Example Solutions (1) In an IEEE 802.11 network, when a STA negotiates its membership of a R-TWT with the R-TWT scheduling AP, it can only set the TIDs that are established as Stream Classification Service (SCS) traffic stream(s) (TS) as R-TWT TIDs for that R-TWT. (a) R-TWT TIDs can be R-TWT Uplink (UL) TIDs, R-TWT Downlink (DL) TIDs, and R-TWT Peer-2-Peer (P2P) TIDs. Especially, the R-TWT P2P TIDs are referred to the TIDs of the SCS traffic streams whose directions are P2P. (b) For a R-TWT P2P TID, the STA has to follow the TID-to-link mapping of the corresponding SCS traffic stream, which is indicated in the QoS characteristics element of the SCS traffic stream.

(2) Multiple SCS traffic streams can share the same TID, only if one or more of the following conditions are met. (a) Those SCS traffic streams have the same delay bound (and/or MSDU lifetime) in the QoS characteristics element. (b) The DSCP range of the TID/UP is set to zero and the original Differentiated Service Code Point (DSCP) range of the TID/UP is covered by other TID, User Priority (UP) or Access Category (AC). (c) Only one TID in an AC can be used as R-TWT TID, or both TIDs in the same AC must be used as R-TWT TIDs. (d) For P2P SCS traffic streams, the SCS traffic streams must have the same TID-to-Link mapping in their QoS Characteristics element.

(3) The R-TWT scheduling AP cannot schedule R-TWT SP time for a R-TWT TID that exceeds the requirement of that R-TWT TID. (a) For example, if a R-TWT TID has only one SCS traffic stream, then the R-TWT SP time (R-TWT SP duration/R-TWT SP interval time) should not be longer than the medium time (time per second) of the SCS traffic stream. (b) If a R-TWT TID has multiple SCS traffic streams, then the medium time should be the total medium time of all the SCS traffic streams of that R-TWT TID. (c) If the TID is R-TWT TID of multiple R-TWTs, then the R-TWT SP time should be the total R-TWT SP time of those R-TWTs. (d) If the medium time of a SCS traffic stream is calculated for the required transmission time over a certain bandwidth (e.g., 20 MHz), then the scheduling AP should reduce channel time allocated for the transmission of the SCS traffic stream if the bandwidth is wider than 20 MHz.

(4) If a R-TWT schedules non-trigger-enabled SPs, the member STA of the R-TWT as a TXOP holder shall ensure that the TXOP ends before the start time of any SPs of the R-TWT, except for the TXOP that is used to transmit R-TWT TIDs after the start time of SP. (a) If the primary AC of the TXOP is not mapped to any R-TWT TIDs of the member STA, then the member STA shall end the TXOP unless it can share the TXOP to transmit the frames of R-TWT TIDs after the start time of SP. (b) Alternatively, if the primary AC of the TXOP is not mapped to any R-TWT TIDs of the member STA, then in at least one embodiment/mode/option the member STA shares the TXOP to transmit the frames of R-TWT TIDs after the start time of SP even if there are still frames of the primary AC to be transmitted. (c) Before a member STA transmits frames that are not R-TWT TIDs of an upcoming R-TWT SP, it should check if it has sufficient time to complete the transmissions of those frames (including the solicited response) before the start time of the upcoming R-TWT SP. If there is insufficient time for this, then the STA should not transmit and instead restarts the backoff process with a Contention Window (CW) of the Access Class [AC] (CW[AC]) and QoS Short Retry Counter (QSRC) of the AC (QSRC[AC]) which is not changed immediately.

(5) If a R-TWT schedules trigger-enabled SPs, the member STA of the R-TWT as a Transmit Opportunity (TXOP) holder shall ensure that it shares the TXOP with the R-TWT scheduling AP before the start time of any SPs of the R-TWT, or ensures the TXOP ends before the start time of any SPs of the R-TWT. (a) The member STA could transmit a frame, such as CTS frame or QoS frame with a Reverse Direction Grant (RDG) set to a first state (e.g., "1") (initiate RDG), to the scheduling AP to share its TXOP. When the AP receives a Clear-To-Send (CTS) frame, it can act as (operate as) a TXOP holder during the duration (or Network Allocation Vector (NAV)) field of CTS frame and may extend the TXOP. (b) The member STA can transmit a frame to share its TXOP with the AP, even if the transmission of the frame cannot be completed before the start time of the R-TWT SP.

(6) A R-TWT scheduling AP as a TXOP holder during a R-TWT SP is able to transmit frames of any R-TWT TIDs of the R-TWT SP as they are frames from the primary AC during the TXOP. In at least one embodiment/mode/option the AP can use Enhanced Distributed Channel Access Functions (EDCAFs) of any ACs to obtain the TXOP during the R-TWT SP, or the AP can only use EDCAFs of R-TWT (DL) TIDs of the R-TWT SP to obtain the TXOP during the R-TWT SP.

(7) A (member or R-TWT scheduled) STA should transmit frames of TIDs that are not R-TWT TIDs of any R-TWTs outside R-TWT SPs.

(8) A member STA should not transmit frames of R-TWT TIDs of a R-TWT outside the SPs of that R-TWT.

(9) A R-TWT scheduled STA (or the member STA of the trigger-enabled R-TWT SP only) follows the rule/behavior of a TWT scheduled STA during a trigger-enabled R-TWT SP. It should be noted that a R-TWT scheduled STA represents a STA supporting R-TWT features.

Figure 2:
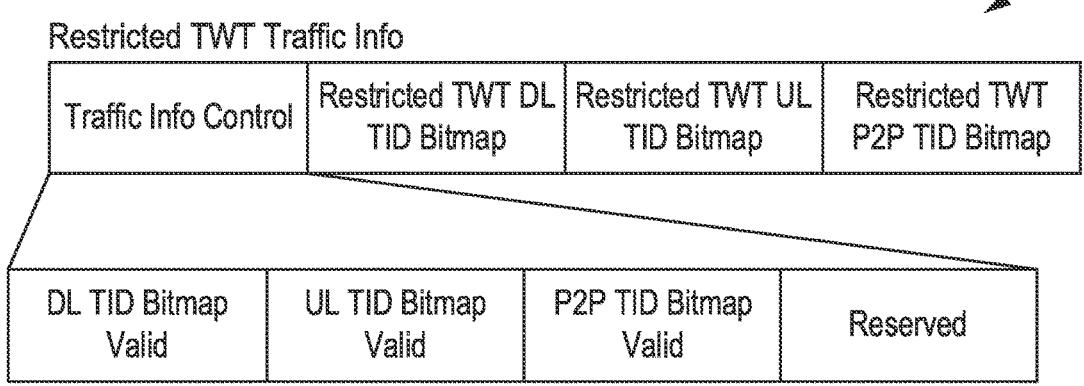
FIG. 2 is a data field diagram of a Restricted TWT Traffic Information element, utilized according to at least one embodiment of the present disclosure.

FIG. 2 illustrates an example embodiment 50 of a Restricted Target Wait Time (R-TWT) Traffic Information field utilized according to at least one embodiment of the present disclosure.

In comparison with it in the IEEE 802.11be D2.0, the following subfields have been added. A Peer-to-Peer (P2P) Traffic Identification (TID) Bitmap Valid field is added, which may comprise a one bit indication. For example, when this field is set to a first state (e.g., "1"), then the Restricted TWT P2P TID Bitmap is present in the restricted TWT Traffic Information field. Otherwise, this field is set to a second state (e.g., "0") then the Restricted TWT P2P TID Bitmap is not present. When this field is set to a second state (e.g., "0"), it is possible that this indicates either: (a) all P2P SCS traffic streams are regarded as R-TWT TIDs of the R-TWT; or (b) that no P2P SCS traffic streams are regarded as R-TWT TIDs of the R-TWT.

The P2P TID Bitmap Valid subfield is set to a second state (e.g., "0") if the Negotiation Type subfield of the TWT element is equal to "2".

A Restricted TWT P2P TID Bitmap has each bit of this subfield representing a TID (e.g., TID from 0 to 7). If a bit in this subfield is set to a first state (e.g., "1"), then the corresponding TID of P2P traffic is regarded as R-TWT TIDs of the R-TWT. Otherwise, this subfield is set to a second state (e.g., "0").

Figure 3:
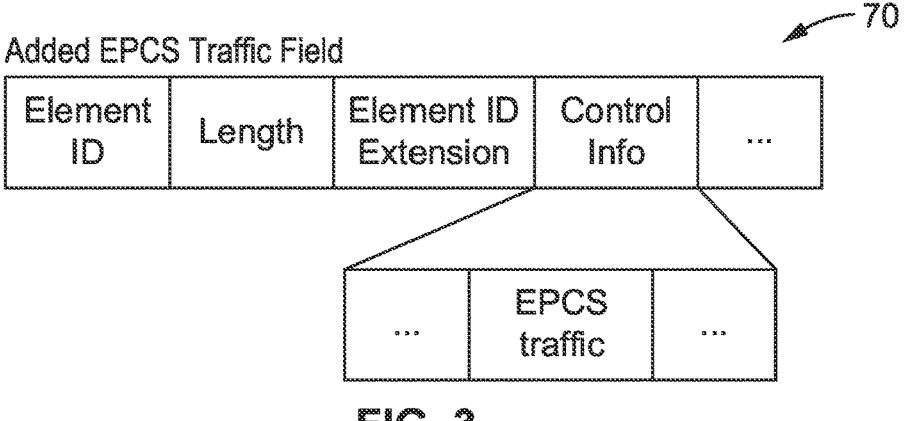
FIG. 3 is a data field diagram of adding an Emergency Preparedness Service (EPCS) priority access enabled field, according to at least one embodiment of the present disclosure.

FIG. 3 illustrates an example embodiment 70 of adding the Emergency Preparedness Service (EPCS) priority access enabled field into the Quality of Service (QoS) characteristics element (QoS characteristics element is an existing element in IEEE specification, refer to 11 be spec, 9.4.2.316 QoS Characteristics element—Figure 9-1002au—QoS Characteristics element format).

If a R-TWT scheduled STA has Emergency Preparedness Communications Service (EPCS) priority access enabled, then it may ignore the R-TWT schedule, under the following conditions. (a) If the R-TWT scheduled STA as a TXOP holder of transmitting EPCS traffic may continue its TXOP across the start time of any R-TWT SPs. Specifically, the STA is not allowed to end its TXOP before the start time of any R-TWT SPs. (b) If the R-TWT scheduled STA as a TXOP holder of transmitting EPCS traffic ignores the overlapping quiet interval during the R-TWT SPs.

The EPCS traffic can be identified as a SCS traffic stream. An EPCS traffic subfield is added in the QoS Characteristics element (it will be noted that the Control Info field is the fourth field in QoS characteristics element, the detail of the Control Info field is found in 11be specification shown as Figure 9-1002av—Control Info field format) to indicate the SCS traffic stream is EPCS traffic. When this field is set to a first state (e.g., "1"), then the SCS traffic stream under this QoS characteristics element is EPCS traffic. Otherwise, this field is set to a second state (e.g., "0") and the SCS traffic stream under this QoS characteristics element is not EPCS traffic.

In cases in which an R-TWT scheduled STA has Emergency Preparedness Communications Service (EPCS) priority access enabled, then it may ignore the R-TWT schedule. If the R-TWT scheduled STA, as a TXOP holder of transmitting EPCS traffic, may continue its TXOP across the start time of any R-TWT SPs. Specifically, the STA does not need to end its TXOP before the start time of any R-TWT SPs. The R-TWT scheduled STA as a TXOP holder of transmitting EPCS traffic may ignore the overlapping quiet interval during the R-TWT SPs.

A member STA of a R-TWT can use EDCA parameters to contend for the channel for R-TWT TIDs (or latency sensitive traffic) during R-TWT SP even if the member STA uses MU EDCA parameters to contend for the channel before the start time of the R-TWT SP and the MU EDCA timer has not expired at the start time of R-TWT SP.

In at least one embodiment/mode/option the member STA continues to use MU EDCA parameters immediately after it finishes transmission during R-TWT SP or immediately after the R-TWT SP ends. The member STA continues to count down the MU EDCA Timer that was paused at the start time of R-TWT SP; unless the MU EDCA Timer is updated during that period.

In at least one embodiment/mode/option the member STA resets the MU EDCA Timer to zero for the ACs of R-TWT UL TIDs (or latency sensitive traffic) at the start time of an R-TWT SP.

A scheduled STA that is not the member STA of a R-TWT shall use MU-EDCA parameters to contend for the channel during the SPs of the R-TWT.

A member STA of a R-TWT shall use MU EDCA parameters to contend for the channel for the non-R-TWT TIDs (or the traffic that is not latency sensitive) during the SPs of the R-TWT.

Figure 4:
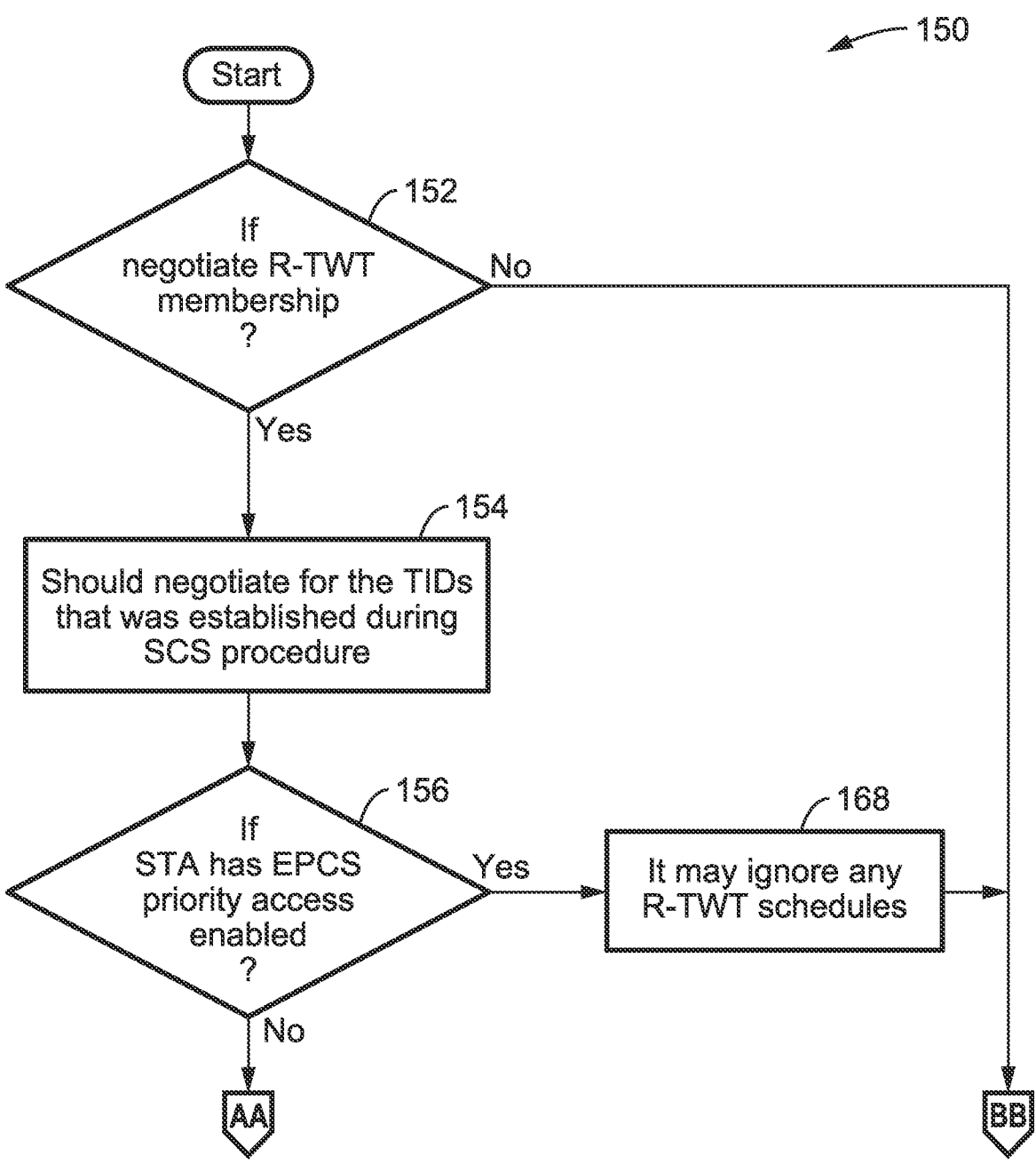
FIG. 4 through FIG. 6 are flow diagrams of negotiating R-TWT and associated TIDs by a non-AP station, according to at least one embodiment of the present disclosure.
Figure 5:
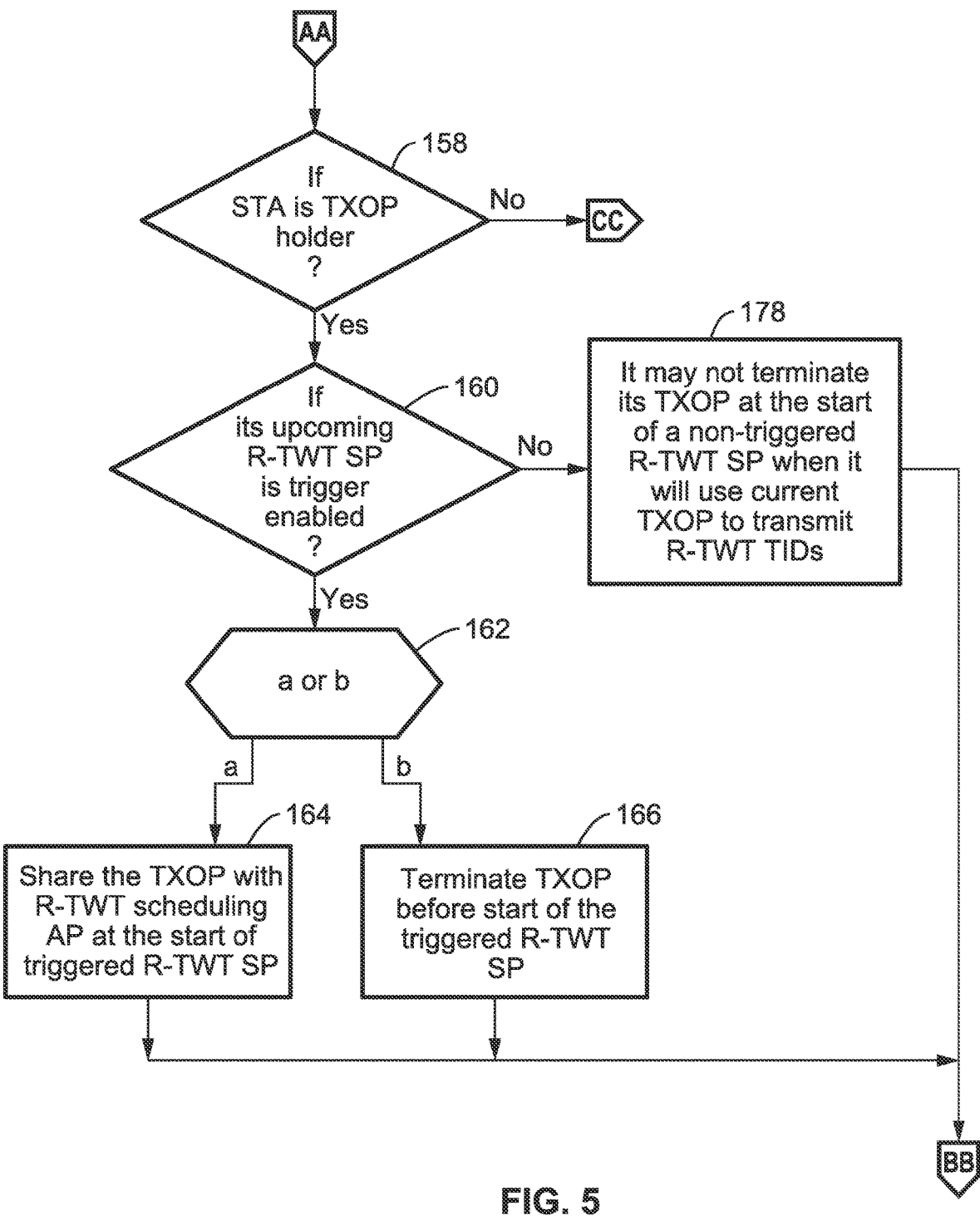
Figure 6:
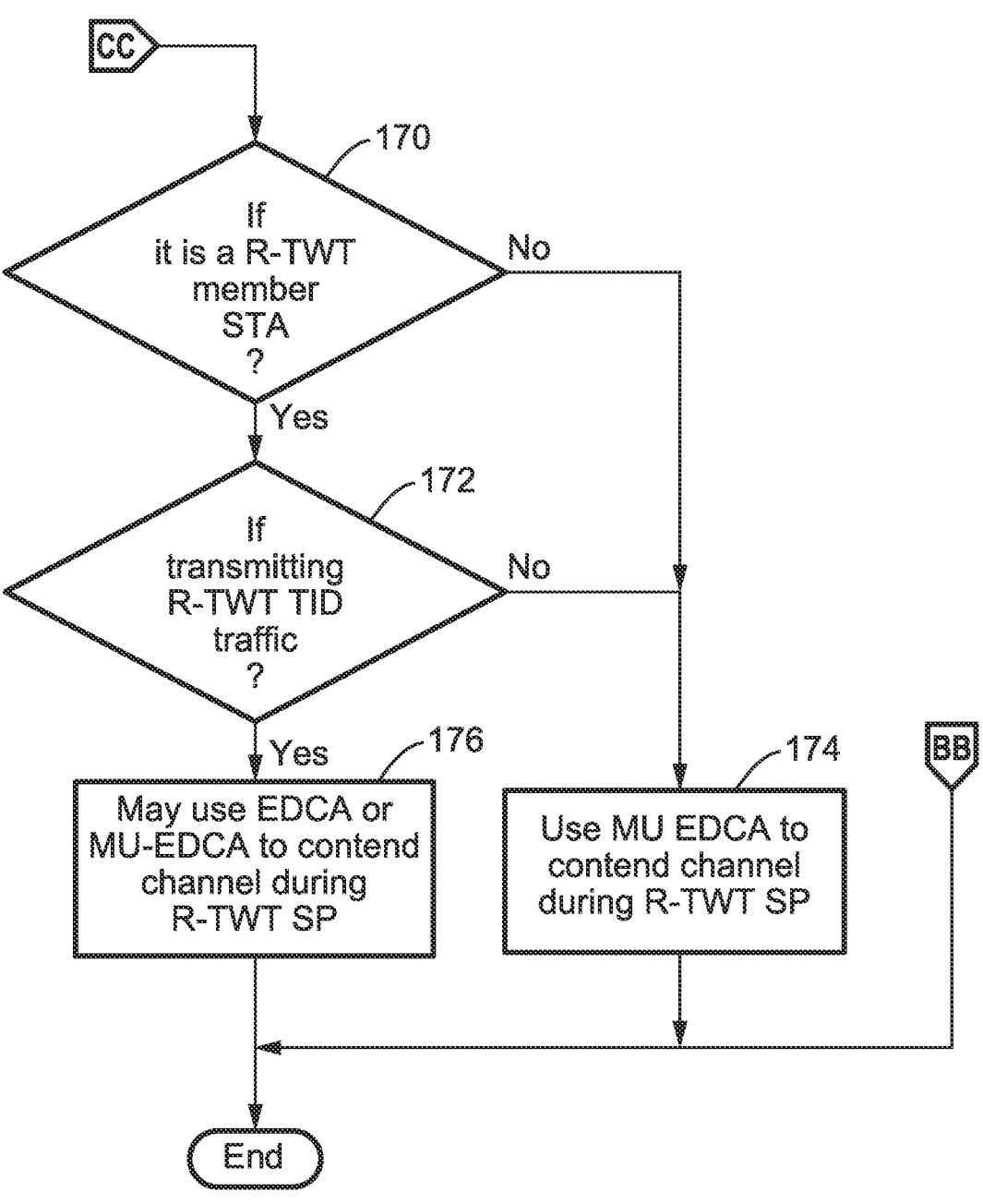

FIG. 4 through FIG. 6 illustrates an example embodiment 150 of R-TWT prioritization for a non-AP STA. At check 152 a determination is made to determine if the non-AP has negotiated an R-TWT membership. If it has not negotiated the membership, then processing ends.

Otherwise, at block 154 the non-AP STA negotiates for the TIDs that were established during the SCS procedure. At check 156 it is determined if the non-AP STA has its EPCS priority access enabled. If it is enabled, then at block 168 the non-AP STA can ignore any R-TWT schedules, and then processing ends.

If at check 156 it is determined that the non-AP STA does not have EPCS priority access enabled, then execution reaches check 158 in FIG. 6 which determines if the STA is the TXOP holder.

If the STA is the TXOP holder, then at check 160 it is determined if the upcoming R-TWT SP is trigger enabled. If it is not trigger enabled, then at block 178 the STA may not terminate its TXOP at the start of a non-triggered R-TWT SP when it will use the current TXOP to transmit R-TWT TIDs, after which execution ends.

Otherwise, at check 162 a determination is made between an "a" and "b" option. In option "a" the STA has determined to share 164 the TXOP with the R-TWT scheduling AP at the start of the triggered R-TWT SP. In option "b" the STA has determined to terminate 166 the TXOP before starting the triggered R-TWT SP. After either option "a" or option "b" is performed, then processing ends.

Figure 7:
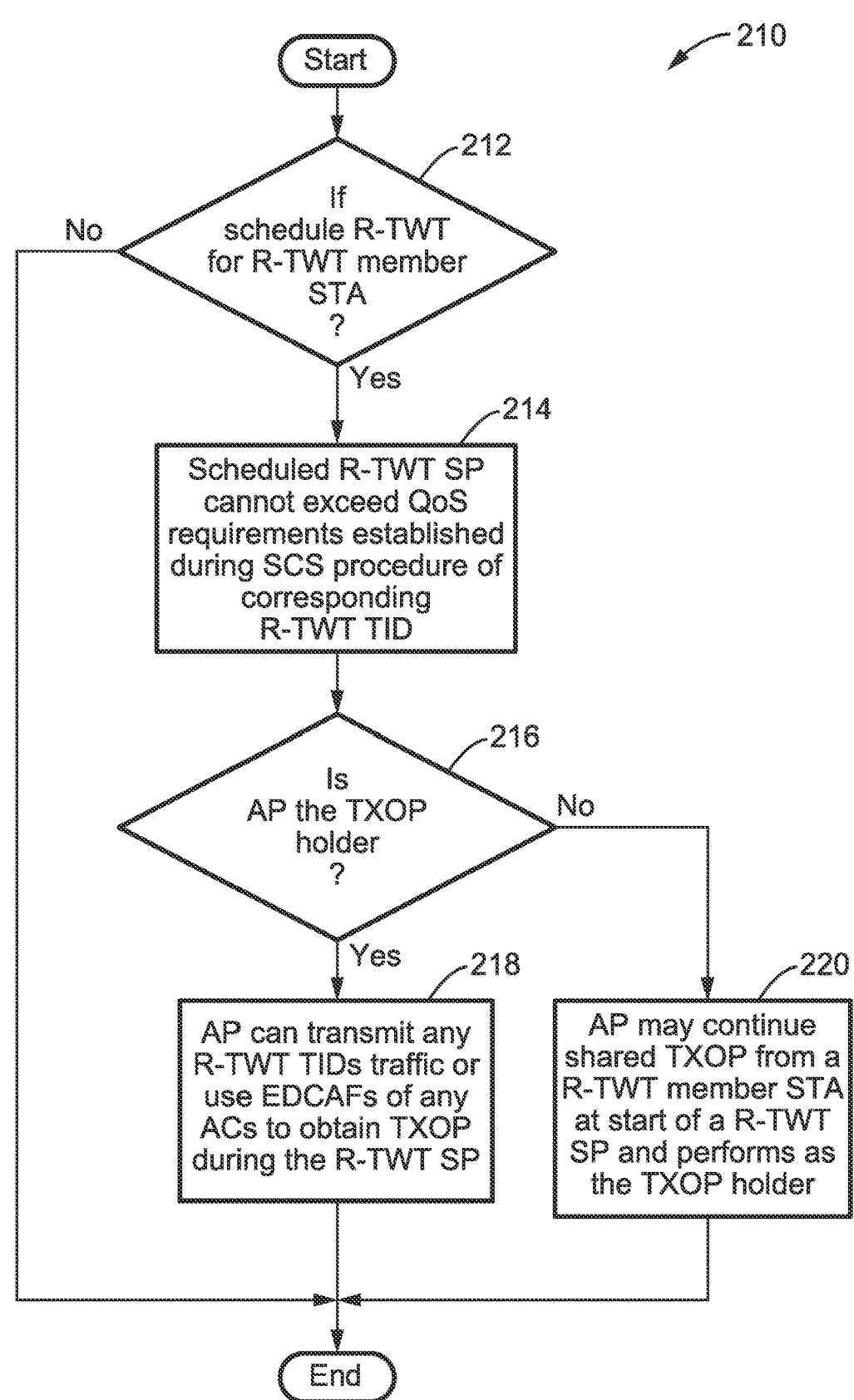
FIG. 7 is a flow diagrams of negotiating R-TWT and associated TIDs by an AP station, according to at least one embodiment of the present disclosure.

Returning now to check 158 of FIG. 6, when the STA is not the TXOP holder, then execution moves to FIG. 7 block 170, which determines if the STA is an R-TWT member STA.

If the condition is met, then at check 172 it is determined if the STA is transmitting an R-TWT TID traffic. If the condition is met, then at block 176 the STA can use an EDCA or MU-EDCA to contend for the channel during the R-TWT SP, after which processing ends.

If the conditions of either checks 170 or 172 are not met, then at block 174, the STA uses MC-EDCA to contend for the channel during the T-TWT SP, after which processing ends.

FIG. 7 illustrates an example embodiment 210 of R-TWT prioritization for an AP STA. At check 212 it is determined if there is scheduled R-TWT for the R-TWT member STA. If the condition is not met, then processing ends.

Otherwise, the condition is met and at block 214 the AP cannot exceed the QoS requirements of the scheduled R-TWT SP during the SCS procedure of the corresponding R-TWT TID.

Then check 216 determines if the AP is the TXOP holder. If the condition is met, then at block 218 the AP can transmit traffic for any R-TWT TIDs or use the EDCAFs of any ACs to obtain the TXOP during the R-TWT SP.

Otherwise, at block 220 the AP can continue the shared TXOP from an R-TWT member STA at the start of a R-TWT SP and performs as the TXOP holder. Execution ends after either block 218 or 220 is executed.

4. DIFs/AIFs Access

4.1. DIFs/AIFs Access Problem

IEEE 802.11 allows a STA to access a channel immediately after it senses channel idle for a DIFS time under certain conditions, such as a packet arrives at the transmit queue of the STA that was empty. This is denoted as a DIFS access. It will be noted that when a DIFS access is used, the STA does not select a backoff count or count down backoff slots. The R-TWT scheduled STAs start to contend for the channel at the start time of R-TWT SP. If they are allowed to use DIFS access to contend the channel, then a collision occurs if more than one STA uses DIFS access. AIFS access is similar to DIFS access, which means that a STA accessing the channel after it senses channel idle for an AIFS time under certain conditions, and those conditions are the same as a DIFS access.

4.2. DIFs/AIFs Access Solution

The R-TWT scheduled STA shall not use DIFS access (and/or AIFS access) to contend for the channel at the start time of an R-TWT SP.

Figure 8:
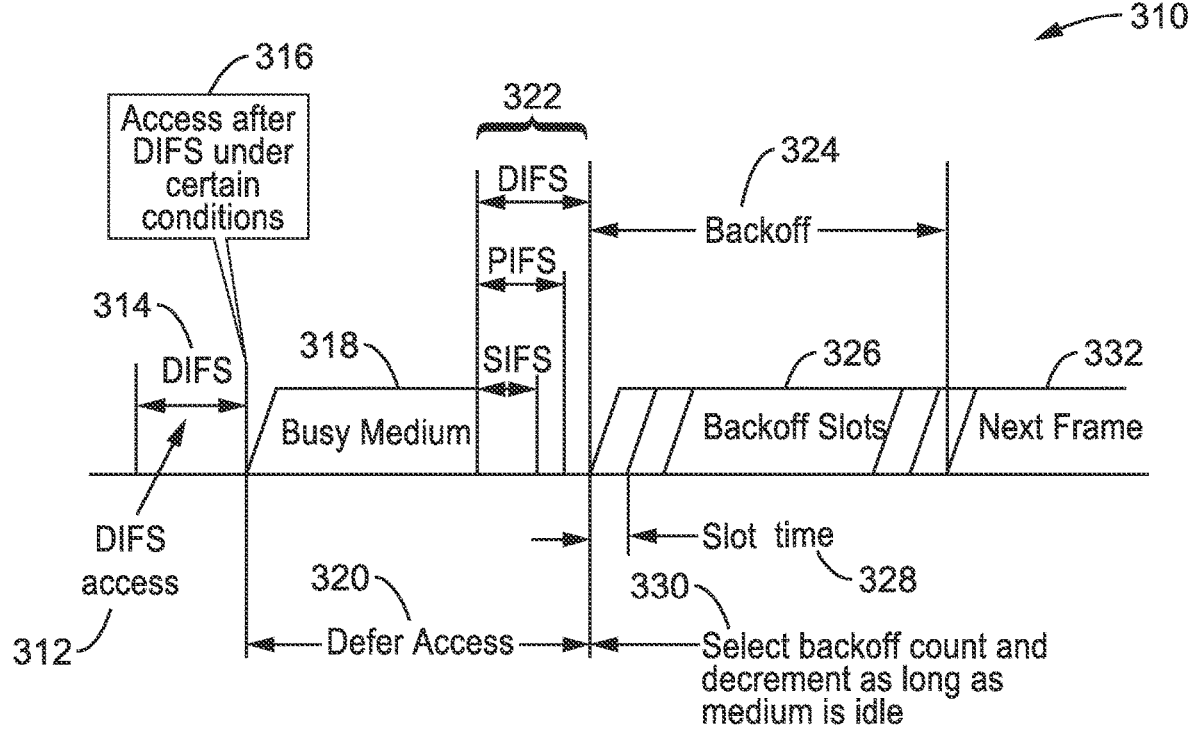
FIG. 8 is a communications diagram which depicts overcoming possible collision issues when accessing the channel after a DIFS/AIFS interval, as utilized according to at least one embodiment of the present disclosure.

FIG. 8 illustrates an example 310 of sensing if the channel is idle for a DIFs time.

The figure depicts a DIFs access 312 in a DIFS period 314, and an access after DIFs 316 which can be utilized under certain conditions. A period is shown of deferred access 320. Medium is shown busy 318 followed by a DIFS 314. After which a backoff 324 is performed, with backoff slots 326 shown, and a single slot time 328. It will be noted that the backoff count can be decremented 330 so long as the medium is idle. The next frame 332 is shown after the backoff.

The following are different solution possibilities.

The R-TWT scheduled STA shall not use DIFS access (or AIFS access) during the R-TWT SP. The R-TWT scheduled STA shall not use a DIFS access (or AIFS access) during the first x time period of the R-TWT SP. The value of x represents a time in unit of seconds, milliseconds, or microseconds. For example, The R-TWT scheduled STA shall not use a DIFS access (or AIFS access) during the first 43 microseconds (a DIFS time+a backoff slot time). It will be noted that in the first x time of an R-TWT SP, the R-TWT scheduled STAs shall not use the DIFS access procedure as shown in 312 in FIG. 8 or the AIFS access procedure which is not shown in this figure. When DIFS/AIFS access is used, the STA doesn't perform the backoff procedure as shown from 330 through 332 start.

The R-TWT scheduled STA can only use a backoff procedure (select backoff count and decrement) to contend for the channel. In at least one embodiment/mode/option the STA is not allowed to select a zero backoff count.

A member STA of a R-TWT can use EDCA parameters to contend for the channel for R-TWT TIDs (or latency sensitive traffic) during R-TWT SP even if the member STA uses MU EDCA parameter to contend for the channel before the start time of the R-TWT SP prior to expiration of the MU EDCA timer at the start time of R-TWT SP.

In at least one embodiment/mode/option the member STA continues to use MU EDCA parameter immediately after it finishes transmission during an R-TWT SP or immediately after the R-TWT SP ends. The member STA continues to count down the MU EDCA Timer that was paused at the start time of the R-TWT SP, unless the MU EDCA Timer has been updated during that period.

In at least one embodiment/mode/option the member STA resets the MU EDCA Timer to zero for the ACs of R-TWT UL TIDs (or latency sensitive traffic) at the start time of R-TWT SP.

A scheduled STA that is not the member STA of a R-TWT uses MU-EDCA parameters to contend for the channel during the SPs of the R-TWT.

A member STA of a R-TWT uses MU EDCA parameters to contend for the channel for the non-R-TWT TIDs (or the traffic that is not latency sensitive) during the SPs of the R-TWT.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, performing transmission of frames between the medium access control (MAC) layers of an IEEE 802.11 network as a wireless station (STA) which is an independent STA or as a STA in a multiple-link device (MLD), and operating as either a regular non-Access Point (AP) STA or an Access Point (AP) STA, for wirelessly communicating with other wireless stations (STAs) using a carrier sense multiple access/collision avoidance (CSMA/CA) mechanism on a wireless local area network (WLAN) in which either enhanced distributed channel access (EDCA) is utilized for random channel access on all the links or trigger-based channel access is utilized for trigger-based (TB) uplink transmission on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit in prioritizing transmissions of setting restricted-target wait time (R-TWT) traffic identifiers (TIDs) during R-TWT membership negotiations, comprising: (d)(i) negotiating an R-TWT SP between an R-TWT scheduled STA with an R-TWT scheduling AP to become a R-TWT member STA of that R-TWT service period (SP); and (d)(ii) wherein said R-TWT SP prioritizes transmissions of low latency traffic with specific TIDs as negotiated, wherein two types of channel access are provided as trigger-enabled channel access and non-trigger-enabled channel access, which identifies the R-TWT SP as either a trigger-enabled R-TWT SP or a non-trigger-enabled R-TWT SP.

A method of performing wireless communication in a network, comprising: (a) performing transmission of frames between medium access control (MAC) layers of an IEEE 802.11 network as a wireless station (STA) which is an independent STA or as a STA in a multiple-link device (MLD), and operating as either a regular non-Access Point (AP) STA or an Access Point (AP) STA, for wirelessly communicating with other wireless stations (STAs) using a carrier sense multiple access/collision avoidance (CSMA/CA) mechanism on a wireless local area network (WLAN) in which either enhanced distributed channel access (EDCA) is utilized for random channel access on all the links or trigger-based channel access is utilized for trigger-based (TB) uplink transmission on all the links; (b) negotiating an R-TWT SP between an R-TWT scheduled STA with an R-TWT scheduling AP to become a R-TWT member STA of that R-TWT SP; and (c) prioritizing in the R-TWT transmissions of low latency traffic with specific TIDs, including R-TWT TIDs, as negotiated, wherein two types of channel access are provided as trigger-enabled channel access and non-trigger-enabled channel access, which identifies the R-TWT SP as either a trigger-enabled R-TWT SP and a non-trigger-enabled R-TWT SP, respectively.

The apparatus or method of any preceding implementation, wherein the negotiated R-TWT TIDs include R-TWT uplink (UL) TIDs, R-TWT downlink (DL) TIDs, and R-TWT peer-to-peer (P2P) TIDs and is established based on stream classification service (SCS) traffic stream(s) as indicated in the quality-of-service (QoS) characteristics element of the SCS traffic stream(s).

The apparatus or method of any preceding implementation, wherein the established R-TWT P2P TID follows the TID-to-link mapping of the corresponding SCS traffic stream.

The apparatus or method of any preceding implementation, wherein multiple SCS traffic streams map to a same TID if at least one of the following conditions are met: (a) wherein SCS traffic streams have the same delay bound, and/or MSDU lifetime, in the QoS characteristics element; (b) wherein a differentiated service code point (DSCP) range of the TID/UP is set to zero; (c) wherein only one TID in an access category (AC) is used as R-TWT TID, or both TIDs in a same AC have to be used as R-TWT TIDs; and (d) wherein the P2P SCS traffic streams have the same TID-to-Link mapping in their QoS Characteristics elements.

The apparatus or method of any preceding implementation, wherein the R-TWT scheduling AP as cannot schedule R-TWT SP time for a R-TWT TID that exceeds the requirement of medium time of the SCS traffic stream of that R-TWT TID, as determined by the following: (a) wherein if a R-TWT TID has multiple SCS traffic streams then medium time is the total medium time of all the SCS traffic streams of that R-TWT TID; (b) wherein if the TID is the R-TWT TID of multiple R-TWTs, then the R-TWT time is the total R-TWT SP time of those R-TWTs; and (c) wherein If medium time of a SCS traffic stream is calculated for the required transmission time over a certain bandwidth, then the scheduling AP reduces channel time allocations for the transmission of the SCS traffic stream if the bandwidth is wider than that specific bandwidth.

The apparatus or method of any preceding implementation, wherein in a non-trigger-enabled R-TWT SP, the R-TWT member STA of this non-trigger-enabled R-TWT SP operates as a TXOP holder and ensures that the TXOP ends before the start time of any SPs of the R-TWT except the primary AC of the TXOP this is mapped to any of the R-TWT TIDs of this non-trigger-enabled R-TWT SP.

The apparatus or method of any preceding implementation, wherein if the primary AC of the TXOP cannot be mapped to any R-TWT TIDs, the R-TWT member STA can continue its TXOP.

The apparatus or method of any preceding implementation, wherein the R-TWT member STA shares the TXOP to transmit frames of the R-TWT TIDs after the start time of this R-TWT SP.

The apparatus or method of any preceding implementation, wherein the R-TWT member STA checks if it has sufficient time to complete frame transmissions, including the solicited response, before the start time of the upcoming R-TWT SP; wherein if there is insufficient time, then the R-TWT member STA does not transmit and it restarts the backoff with a contention window (CW) of the AC, and a QoS short retry counter (QSRC) of the AC which is unchanged.

The apparatus or method of any preceding implementation, wherein in trigger-enabled R-TWT SP the R-TWT member STA as a TXOP holder assures that it shares the TXOP with the R-TWT scheduling AP before the start time of any R-TWT SPs, or it assures that the TXOP ends before the start time of any R-TWT SPs, comprising: (a) wherein the member STA can transmit a frame with a reverse direction grant (RDG) set to indicate that the scheduling AP is to share its TXOP, and when the AP receives the frame with the RDG, it can act as a TXOP holder during the duration, or network allocation vector (NAV) field of the frame, and can extend the TXOP; and (b) wherein the member STAs transmit a frame to share its TXOP with the AP even if the transmission of the frame will not be completed before the start time of the R-TWT SP.

The apparatus or method of any preceding implementation, wherein the R-TWT scheduling AP as a TXOP holder during a R-TWT SP transmits frames of any R-TWT TIDs of the R-TWT SP as frames from the primary AC during the TXOP.

The apparatus or method of any preceding implementation, wherein the AP uses enhanced distributed channel access functions (EDCAFs) of any ACs to obtain the TXOP during the R-TWT SP, or the AP only uses EDCAFs of R-TWT (DL) TIDs of the R-TWT SP to obtain the TXOP during the R-TWT SP.

The apparatus or method of any preceding implementation, wherein an R-TWT member STA, or a R-TWT scheduled STA, transmits frames of TIDs that are not R-TWT TIDs of any R-TWTs outside R-TWT SPs.

The apparatus or method of any preceding implementation, wherein the member STA does not transmit frames of R-TWT TIDs of a R-TWT outside the SPs of that R-TWT.

The apparatus or method of any preceding implementation, wherein if a R-TWT scheduled STA has emergency preparedness communications service (EPCS) priority access enabled, then it ignores the R-TWT schedule, comprising: (a) wherein if the R-TWT scheduled STA as a TXOP holder of transmitting EPCS traffic continues its TXOP across the start time of any R-TWT SPs, wherein the STA need not end its TXOP before the start time of any R-TWT SPs; and (b) wherein if the R-TWT scheduled STA as a TXOP holder of transmitting EPCS traffic ignores the overlapping quiet interval during the R-TWT SPs.

The apparatus or method of any preceding implementation, wherein the R-TWT scheduled STA identifies the emergency preparedness communications service (EPCS) priority access as a SCS traffic stream.

The apparatus or method of any preceding implementation, wherein the EPCS traffic subfield is added in the QoS Characteristics element to indicate the SCS traffic stream is EPCS traffic.

The apparatus or method of any preceding implementation, wherein when this EPCS traffic subfield is set to a first state then the SCS traffic stream under this QoS characteristics element is EPCS traffic; otherwise, this field is set to a second state and the SCS traffic stream under this QoS characteristics element is not considered EPCS traffic.

The apparatus or method of any preceding implementation, wherein the R-TWT member STA uses EDCA parameters to contend for the channel for R-TWT TIDs, or latency sensitive traffic, during an R-TWT SP even if the member STA uses multiple-user (MU) EDCA parameters to contend for the channel before the start time of the R-TWT SP and the MU EDCA timer is not expired at the start time of R-TWT SP.

The apparatus or method of any preceding implementation, wherein the member STA continues to use multiple-user (MU) EDCA parameter immediately after it finishes transmission during R-TWT SP or immediately after the R-TWT SP ends, and wherein the member STA continues to count down the MU EDCA Timer that was paused at the start time of R-TWT SP unless the MU EDCA Timer is updated during that period.

The apparatus or method of any preceding implementation, wherein the member STA resets the multiple-user (MU)

EDCA Timer to zero for the ACs of R-TWT UPLOAD (UL) TIDs, or latency sensitive traffic, at the start time of R-TWT SP.

The apparatus or method of any preceding implementation, wherein the R-TWT scheduled STA that is not a member STA of the R-TWT uses multiple-user (MU) EDCA parameters to contend for the channel during the SPs of the R-TWT.

The apparatus or method of any preceding implementation, wherein the R-TWT member STA uses multiple-user (MU) EDCA parameters to contend for the channel for the non-R-TWT TIDs, or the traffic that is not latency sensitive, during the SPs of the R-TWT.

The apparatus or method of any preceding implementation, wherein the R-TWT scheduled STA does not use DIFS access, and/or AIFS access, to contend for the channel at the start time of R-TWT SP.

The apparatus or method of any preceding implementation, wherein the R-TWT scheduled STA does not use DIFS access, or AIFS access, during the R-TWT SP.

The apparatus or method of any preceding implementation, wherein the R-TWT scheduled STA does not use DIFS access, or AIFS access, during the first x time of the R-TWT SP, in which x represents a time in units of second, milliseconds or microseconds.

The apparatus or method of any preceding implementation, wherein the R-TWT scheduled STA uses a backoff procedure, selects a backoff count and decrements it, to contend for the channel, and wherein the STA is not allowed to select a backoff count equal to zero.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including", "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
  (a) a wireless communication circuit, performing transmission of frames between a medium access control (MAC) layers of an IEEE 802.11 network as a wireless station (STA) which is an independent STA or as a STA in a multiple-link device (MLD), and operating as either a regular non-Access Point (AP) STA or an Access Point (AP) STA, for wirelessly communicating with other wireless stations (STAs) using a carrier sense multiple access/collision avoidance (CSMA/CA) mechanism on a wireless local area network (WLAN) in which either enhanced distributed channel access (EDCA) is utilized for random channel access on all links or trigger-based channel access is utilized for trigger-based (TB) uplink transmission on all the links;
  (b) a processor coupled to said wireless communication circuit for operating on the WLAN;
  (c) a non-transitory memory storing instructions executable by the processor for communicating with other STAs; and
  (d) wherein said instructions, when executed by the processor, perform steps of a wireless communications protocol for said wireless communication circuit in prioritizing transmissions of setting restricted-target wait time (R-TWT) traffic identifiers (TIDs) during R-TWT membership negotiations, comprising:
    (i) negotiating an R-TWT SP between an R-TWT scheduled STA with an R-TWT scheduling AP to become a R-TWT member STA of that R-TWT service period (SP); and (ii) wherein said R-TWT SP prioritizes transmissions of low latency traffic with specific TIDs as negotiated, wherein two types of channel access are provided as trigger-enabled channel access and non-trigger-enabled channel access, which identifies the R-TWT SP as either a trigger-enabled R-TWT SP or a non-trigger-enabled R-TWT SP.

2. The apparatus recited in claim 1, wherein the negotiated R-TWT TIDs include R-TWT uplink (UL) TIDs, R-TWT downlink (DL) TIDs, and R-TWT peer-to-peer (P2P) TIDs and is established based on stream classification service (SCS) traffic stream(s) as indicated in a quality-of-service (QoS) characteristics element of the SCS traffic stream(s).

3. The apparatus recited in claim 2, wherein the established R-TWT P2P TID follows TID-to-link mapping of a corresponding SCS traffic stream.

4. The apparatus recited in claim 2, wherein multiple SCS traffic streams map to a same TID if at least one of the following conditions are met:
  (a) wherein SCS traffic streams have an identical delay bound, and/or MSDU lifetime, in a quality-of-service (QoS);
  (b) wherein a differentiated service code point (DSCP) range of the TID/UP is set to zero;
  (c) wherein only one TID in an access category (AC) is used as R-TWT TID, or both TIDs in a same AC have to be used as R-TWT TIDs; and
  (d) wherein the P2P SCS traffic streams have an identical TID-to-Link mapping in their QoS Characteristics elements.

5. The apparatus recited in claim 4, wherein the R-TWT scheduling AP cannot schedule R-TWT SP time for a R-TWT TID that exceeds requirements of medium time of the SCS traffic stream of that R-TWT TID, as determined by the following:
  (a) wherein if a R-TWT TID has multiple SCS traffic streams wherein medium time is total medium time of all the SCS traffic streams of that R-TWT TID;
  (b) wherein if the TID is the R-TWT TID of multiple R-TWTs, then the R-TWT time is the total R-TWT SP time of those R-TWTs; and
  (c) wherein If medium time of a SCS traffic stream is calculated for required transmission time over a certain bandwidth, then the R-TWT scheduling AP reduces channel time allocations for the transmission of the SCS traffic stream if the bandwidth is wider than that specific bandwidth.

6. The apparatus recited in claim 1, wherein in a non-trigger-enabled R-TWT SP, the R-TWT member STA of this non-trigger-enabled R-TWT SP operates as a TXOP holder and ensures that the TXOP ends before a start time of any SPs of the R-TWT except a primary access category (AC) of the TXOP this is mapped to any of the R-TWT TIDs of this non-trigger-enabled R-TWT SP.

7. The apparatus recited in claim 6, wherein if a primary access category (AC) of the TXOP cannot be mapped to any R-TWT TIDs, the R-TWT member STA can continue its TXOP.

8. The apparatus recited in claim 7, wherein the R-TWT member STA shares the TXOP to transmit frames of the R-TWT TIDs after a start time of this R-TWT SP.

9. The apparatus recited in claim 6, wherein the R-TWT member STA checks if it has sufficient time to complete frame transmissions, including a solicited response, before a start time of the upcoming R-TWT SP; wherein if there is insufficient time, then the R-TWT member STA does not transmit and it restarts a backoff with a contention window

17

(CW) of an access category (AC), and a QoS short retry counter (QSRC) of the AC which is unchanged.

10. The apparatus recited in claim 1, wherein in trigger-enabled R-TWT SP the R-TWT member STA as a TXOP holder assures that it shares the TXOP with the R-TWT scheduling AP before a start time of any R-TWT SPs, or it assures that the TXOP ends before the start time of any R-TWT SPs, comprising:

(a) wherein the member STA can transmit a frame with a reverse direction grant (RDG) set to indicate that the scheduling AP is to share its TXOP, and when the AP receives the frame with the RDG, it can act as a TXOP holder during the duration, or network allocation vector (NAV) field of the frame, and can extend the TXOP; and (b) wherein the member STAs transmit a frame to share its TXOP with the AP even if the transmission of the frame will not be completed before the start time of the R-TWT SP.

11. The apparatus recited in claim 1, wherein the R-TWT scheduling AP as a TXOP holder during a R-TWT SP transmits frames of any R-TWT TIDs of the R-TWT SP as frames from a primary access category (AC) during a TXOP.

12. The apparatus recited in claim 11, wherein the AP uses enhanced distributed channel access functions (EDCAFs) of any ACs to obtain a TXOP during the R-TWT SP, or the AP only uses EDCAFs of R-TWT (DL) TIDS of the R-TWT SP to obtain the TXOP during the R-TWT SP.

13. The apparatus recited in claim 1, wherein an R-TWT member STA, or a R-TWT scheduled STA, transmits frames of TIDs that are not R-TWT TIDs of any R-TWTs outside R-TWT SPs.

14. The apparatus recited in claim 1, wherein the member STA does not transmit frames of R-TWT TIDs of a R-TWT outside the SPs of that R-TWT.

15. The apparatus recited in claim 1, wherein if a R-TWT scheduled STA has emergency preparedness communications service (EPCS) priority access enabled, then it ignores an R-TWT schedule, comprising:

(a) wherein if the R-TWT scheduled STA as a TXOP holder of transmitting EPCS traffic continues its TXOP across a start time of any R-TWT SPs, wherein the STA need not end its TXOP before the start time of any R-TWT SPs; and (b) wherein if the R-TWT scheduled STA as a TXOP holder of transmitting EPCS traffic ignores the overlapping quiet interval during the R-TWT SPs.

16. The apparatus recited in claim 15, wherein the R-TWT scheduled STA identifies the emergency preparedness communications service (EPCS) priority access as a stream classification service (SCS) traffic stream.

17. The apparatus recited in claim 16, wherein the EPCS traffic subfield is added in a QoS Characteristics element to indicate the SCS traffic stream is EPCS traffic.

18. The apparatus recited in claim 17, wherein when this EPCS traffic subfield is set to a first state then the SCS traffic stream under this QoS characteristics element is EPCS traffic; otherwise, this field is set to a second state and the SCS traffic stream under this QoS characteristics element is not considered EPCS traffic.

19. The apparatus recited in claim 1, wherein the R-TWT member STA uses EDCA parameters to contend for a channel for R-TWT TIDs, or latency sensitive traffic, during an R-TWT SP even if the member STA uses multiple-user (MU) EDCA parameters to contend for a channel before a start time of the R-TWT SP and the MU EDCA timer is not expired at the start time of R-TWT SP.

20. The apparatus recited in claim 19, wherein the member STA continues to use multiple-user (MU) EDCA parameter immediately after it finishes transmission during R-TWT SP or immediately after the R-TWT SP ends, and wherein the member STA continues to count down a MU EDCA Timer that was paused at a start time of R-TWT SP unless the MU EDCA Timer is updated during that period.

21. The apparatus recited in claim 19, wherein the member STA resets a multiple-user (MU) EDCA Timer to zero for access categories (ACs) of R-TWT UPLOAD (UL) TIDs, or latency sensitive traffic, at of R-TWT SP.

22. The apparatus recited in claim 1, wherein the R-TWT scheduled STA that is not a member STA of the R-TWT uses multiple-user (MU) EDCA parameters to contend for a channel during the SPs of the R-TWT.

23. The apparatus recited in claim 1, wherein the R-TWT member STA uses multiple-user (MU) EDCA parameters to contend for a channel for the non-R-TWT TIDs, or the traffic that is not latency sensitive, during the SPs of the R-TWT.

24. The apparatus recited in claim 1, wherein the R-TWT scheduled STA does not use DIFS access distributed coordination function (DCF) interframe space (DIFs), and/or arbitration interframe space (AIFS), to contend for the channel at a start time of R-TWT SP.

25. The apparatus recited in claim 24, wherein the R-TWT scheduled STA does not use distributed coordination function (DCF) interframe space (DIFs), or arbitration interframe space (AIFS), during the R-TWT SP.

26. The apparatus recited in claim 24, wherein the R-TWT scheduled STA does not use distributed coordination function (DCF) interframe space (DIFs), or arbitration interframe space (AIFS), during a first x time of the R-TWT SP, in which x represents a time in units of second, milliseconds or microseconds.

27. The apparatus recited in claim 24, wherein the R-TWT scheduled STA uses a backoff procedure, selects a backoff count and decrements it, to contend for a channel, and wherein the STA is not allowed to select a backoff count equal to zero.

28. A method of performing wireless communication in a network, comprising:

(a) performing transmission of frames between medium access control (MAC) layers of an IEEE 802.11 network as a wireless station (STA) which is an independent STA or as a STA in a multiple-link device (MLD), and operating as either a regular non-Access Point (AP) STA or an Access Point (AP) STA, for wirelessly communicating with other wireless stations (STAs) using a carrier sense multiple access/collision avoidance (CSMA/CA) mechanism on a wireless local area network (WLAN) in which either enhanced distributed channel access (EDCA) is utilized for random channel access on all links or trigger-based channel access is utilized for trigger-based (TB) uplink transmission on all the links;

(b) negotiating an restricted target wake time (R-TWT) service period (SP) between an R-TWT scheduled STA with an R-TWT scheduling AP to become a R-TWT member STA of that R-TWT SP; and (c) prioritizing in the R-TWT transmissions of low latency traffic with specific transmission identifiers (TIDs), including R-TWT TIDs, as negotiated, wherein two types of channel access are provided as trigger-enabled channel access and non-trigger-enabled channel access, which identifies the R-TWT SP as either a trigger-enabled R-TWT SP and a non-trigger-enabled R-TWT SP, respectively.

\* \* \* \* \*